US012636695B2

(12) United States Patent　　　　　(10) Patent No.:　　US 12,636,695 B2
Eicher et al.　　　　　　　　　　　　　(45) Date of Patent:　　　May 26, 2026

(54) MOBILE CHASSIS GOOSENECK STRAIGHTENER

(71) Applicant: STI Holdings, Inc., Stoughton, WI (US)

(72) Inventors: Todd Randall Eicher, Monticello, WI (US); Steven Paul Moore, Oregon, WI (US); Thomas James Draxler, Deerfield, WI (US)

(73) Assignee: STI Holdings, Inc., Stoughton, WI (US)

( * ) Notice: Subject to any disclaimer, the term of this patent is extended or adjusted under 35 U.S.C. 154(b) by 294 days.

(21) Appl. No.: 18/421,038

(22) Filed: Jan. 24, 2024

(65) Prior Publication Data

US 2024/0246132 A1　　　Jul. 25, 2024

Related U.S. Application Data

(60) Provisional application No. 63/481,244, filed on Jan. 24, 2023.

(51) Int. Cl.
*B21D 1/12*　　　　(2006.01)
*B21D 1/06*　　　　(2006.01)
*B21D 1/10*　　　　(2006.01)
*B21D 1/14*　　　　(2006.01)
*F16M 11/20*　　　(2006.01)

(52) U.S. Cl.
CPC ................. *B21D 1/12* (2013.01); *B21D 1/06* (2013.01); *B21D 1/10* (2013.01); *B21D 1/14* (2013.01); *F16M 11/20* (2013.01)

(58) Field of Classification Search
CPC ... B21D 1/06; B21D 1/10; B21D 1/12; B21D 1/14; F16M 11/20
USPC ........................................................... 72/705
See application file for complete search history.

(56) References Cited

U.S. PATENT DOCUMENTS

| | | | |
|---|---|---|---|
| 1,137,132 A | 4/1915 | Gross | |
| 1,907,925 A | 5/1933 | Wochner | |
| 2,008,929 A | 7/1935 | Scherer | |
| 3,034,563 A * | 5/1962 | Gaspar | .................... B21D 1/14 72/705 |
| 3,776,019 A | 12/1973 | Shaw | |
| 3,826,188 A | 7/1974 | Eberle | |

(Continued)

*Primary Examiner* — Christopher L Templeton
*Assistant Examiner* — Matthew Stephens
(74) *Attorney, Agent, or Firm* — Michael Best & Friedrich LLP

(57) ABSTRACT

A mobile container chassis gooseneck straightener including a wheeled trailer. A frame structure of the straightener includes spaced top and bottom sections that receive a container chassis gooseneck. The frame structure includes a front end with a fixed column extending between the top and bottom sections. The frame structure includes a rear end comprising a removable link connecting the top and bottom sections. The removable link has a coupled state in which it rigidly secures the top and bottom sections and an uncoupled state in which the top and bottom sections are unsecured at the rear end. A hydraulic cylinder is supported by the frame structure and configured to exert vertical load on the container chassis gooseneck to be straightened within the frame structure. The frame structure is configured to bear the vertical load. A hydraulic power source is supported by the trailer and connected to power the hydraulic cylinder.

11 Claims, 7 Drawing Sheets

(56) References Cited

U.S. PATENT DOCUMENTS

| | | | |
|---|---|---|---|
| 4,067,222 A | | 1/1978 | Eck |
| 4,088,002 A | * | 5/1978 | Andrew .................. B21D 1/14 |
| | | | 72/457 |
| 4,090,391 A | | 5/1978 | Hish |
| 4,247,966 A | * | 2/1981 | Labbe ..................... B21D 1/14 |
| | | | 24/116 R |
| 4,574,614 A | | 3/1986 | Field |
| 6,499,332 B2 | | 12/2002 | Clingan, Jr. |
| 6,553,903 B2 | | 4/2003 | Hawkins |
| 7,104,107 B2 | | 9/2006 | Buckler et al. |
| 7,900,494 B1 | | 3/2011 | Chavez |
| 9,539,635 B2 | | 1/2017 | Mitze |
| 2004/0103712 A1 | | 6/2004 | Nakano |
| 2008/0066519 A1 | * | 3/2008 | Potter ..................... B21D 1/12 |
| | | | 72/457 |
| 2010/0126246 A1 | * | 5/2010 | Smith ..................... B21D 1/14 |
| | | | 72/447 |

* cited by examiner

MOBILE CHASSIS GOOSENECK STRAIGHTENER

CROSS-REFERENCE TO RELATED APPLICATIONS

This application claims priority to U.S. Provisional Patent Application No. 63/481,244, filed Jan. 24, 2023, the entire contents of which are incorporated by reference herein.

BACKGROUND

The present invention relates to a hydraulic-powered frame straightening device.

SUMMARY

In one aspect, the invention provides a mobile container chassis gooseneck straightener including a wheeled trailer including a base and a tongue configured to join with a hitch of a tow vehicle. A frame structure of the straightener includes a top section and a bottom section spaced from the top section to receive a container chassis gooseneck therebetween. The frame structure further includes a front end with a fixed column extending between the top and bottom sections. The frame structure further includes a rear end comprising a removable link connecting the top and bottom sections. The removable link has a coupled state in which it rigidly secures the top and bottom sections and an uncoupled state in which the top and bottom sections are unsecured at the rear end. A hydraulic cylinder is supported by the frame structure and configured to exert a vertical load on the container chassis gooseneck to be straightened within the frame structure. The frame structure, including the removable link, is configured to bear the vertical load. A hydraulic power source is supported by the wheeled trailer and connected with the hydraulic cylinder to power movement of the hydraulic cylinder.

In another aspect, the invention provides a method of correcting a shape of a deformed gooseneck on a container chassis with a mobile straightener. The mobile straightener is provided on a wheeled trailer and towed to a site of the deformed gooseneck. A structural link at a rear end of a frame structure of the mobile straightener is removed to widen an entry path for the gooseneck to enter a receiving channel thereof. The wheeled trailer is backed up to a front of the container chassis to accept the deformed gooseneck into the receiving channel, and the deformed gooseneck is guided into a prescribed position by a plurality of guides on the frame structure. The structural link at the rear end of the frame structure is re-coupled while the deformed gooseneck is in the receiving channel to restrict the entry path. The deformed gooseneck is supported at a forward reaction member of the frame structure and a rearward reaction member of the frame structure. Vertical load is applied to the deformed gooseneck at a position between the forward and rearward reaction members with a hydraulic cylinder coupled to the frame structure, the vertical load being transmitted through the gooseneck to the forward and rearward reaction members and correcting a deformation in the deformed gooseneck. The hydraulic cylinder is powered by a hydraulic power unit on-board the wheeled trailer. The structural link at the rear end of the frame structure of the mobile straightener is removed to widen the entry path. The wheeled trailer is pulled forward to remove the corrected gooseneck from the mobile straightener.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
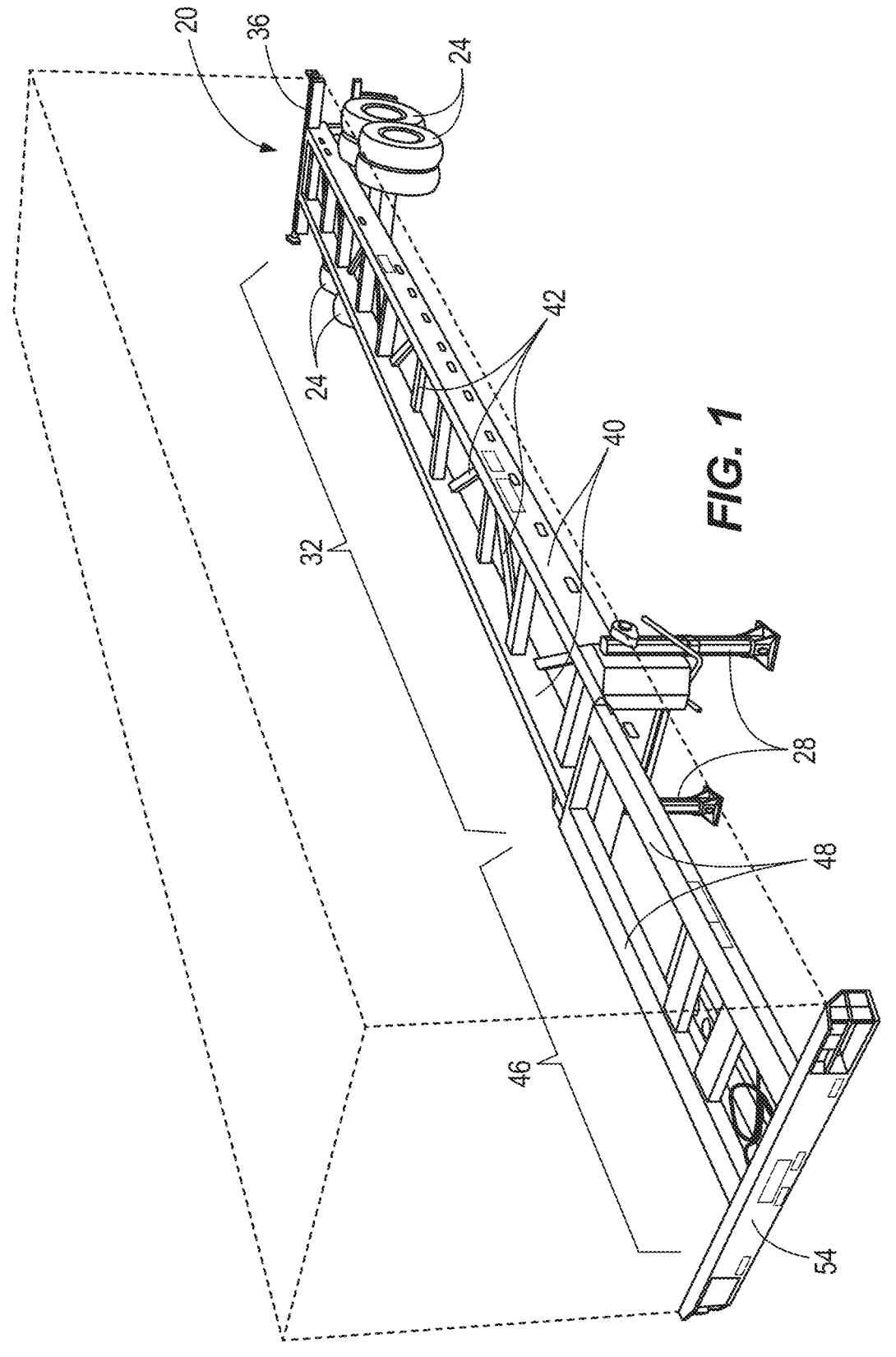
FIG. 1 is a perspective view of an intermodal chassis, or container chassis, having a gooseneck.

FIG. 1 illustrates an intermodal container chassis 20 according to one known construction. Such a chassis 20 may be referred to in the art as an intermodal chassis, a container chassis, or a skeletal trailer. The container chassis 20 is designed for receiving a separate standalone intermodal cargo container (shown in phantom). Such cargo containers are generally standardized and used for overseas shipping and then converted to a semi-trailer for over-the-road transport via the container chassis 20. For example, a container is offloaded from a ship at a port and then placed onto the container chassis 20 for further transport to another location on land, away from the port. The container chassis 20 includes multiple wheels 24 on multiple axles toward a rear end thereof. Toward a front end, the container chassis 20 includes a set of adjustable landing gear 28 configured to support the container chassis (with or without the container attached) in the horizontal orientation against the ground when disconnected from a tow vehicle for storage.

The main section 32 of the container chassis 20, which can make up a majority of its longitudinal length, spans between the landing gear 28 and the rear end, which has a bumper or bolster 36 just aft of the wheels. The main section 32 includes two primary longitudinal beams 40 and a plurality of cross-members 42 therebetween, all of which constitute a structural frame for supporting the cargo container. The wheels 24 and the landing gear 28 are also supported by the structural frame of the container chassis 20. Forward of the main section 32, the container chassis 20 includes a gooseneck 46. The gooseneck 46 is a cantilevered portion that extends forward of the main section 32 and/or forward of the landing gear 28. The gooseneck 46 includes a pair of longitudinal beams 48 and, between these beams, a king pin 50 (FIG. 2) for a fifth-wheel coupling. The beams 48 can have a standard spacing corresponding to standardized cargo containers, as the beams 48 may be at least partially received into bottom grooves or channels in the containers. The front end of the container chassis 20 includes a front bolster 54 that is elongated in a widthwise direction, transverse to the longitudinal transport direction. The front bolster 54 extends widthwise approximately the same width as the track defined by the wheels 24 (at least a majority thereof), and beyond the width of the two longitudinal beams 48 of the gooseneck 46. The container chassis 20 has several mounting points for securement with the cargo container. The mounting points include multiple latching pins provided within the front bolster 54 and extendable rearward therefrom, into receptacles in the container. These can be provided in well-known configurations, or variations thereof-either existing or later developed.

In some cases, the gooseneck 46 can develop droop and/or crown, either at the time of original manufacture (e.g., from welding heat) or after rough usage (e.g., "nose loading" whereby a loaded cargo container is initially set down only onto the gooseneck 46 of the container chassis 20). However they may be developed, droop and crown represent deformation from the intended or initial manufactured configuration—which may be a linear horizontal configuration, although some constructions may vary. In this particular context, the configuration of the gooseneck 46 refers to the shape, and particularly the shape as viewed in a side elevation. The present disclosure provides a mobile straightener 60 (FIGS. 2-7) that can be transported easily to the location of a container chassis having a deformed gooseneck. In particular, the straightener 60 can include a multi-section frame structure supported, along with at least one hydraulic cylinder 64 (which can be referred to as a "jack" or "press"), on a wheeled trailer 66. The trailer 66 can define a base on which the frame structure is supported, and the trailer 66 can have a tongue (e.g., configured for receiving a ball hitch) or another conventional towing coupler at its front end.

Figure 2:
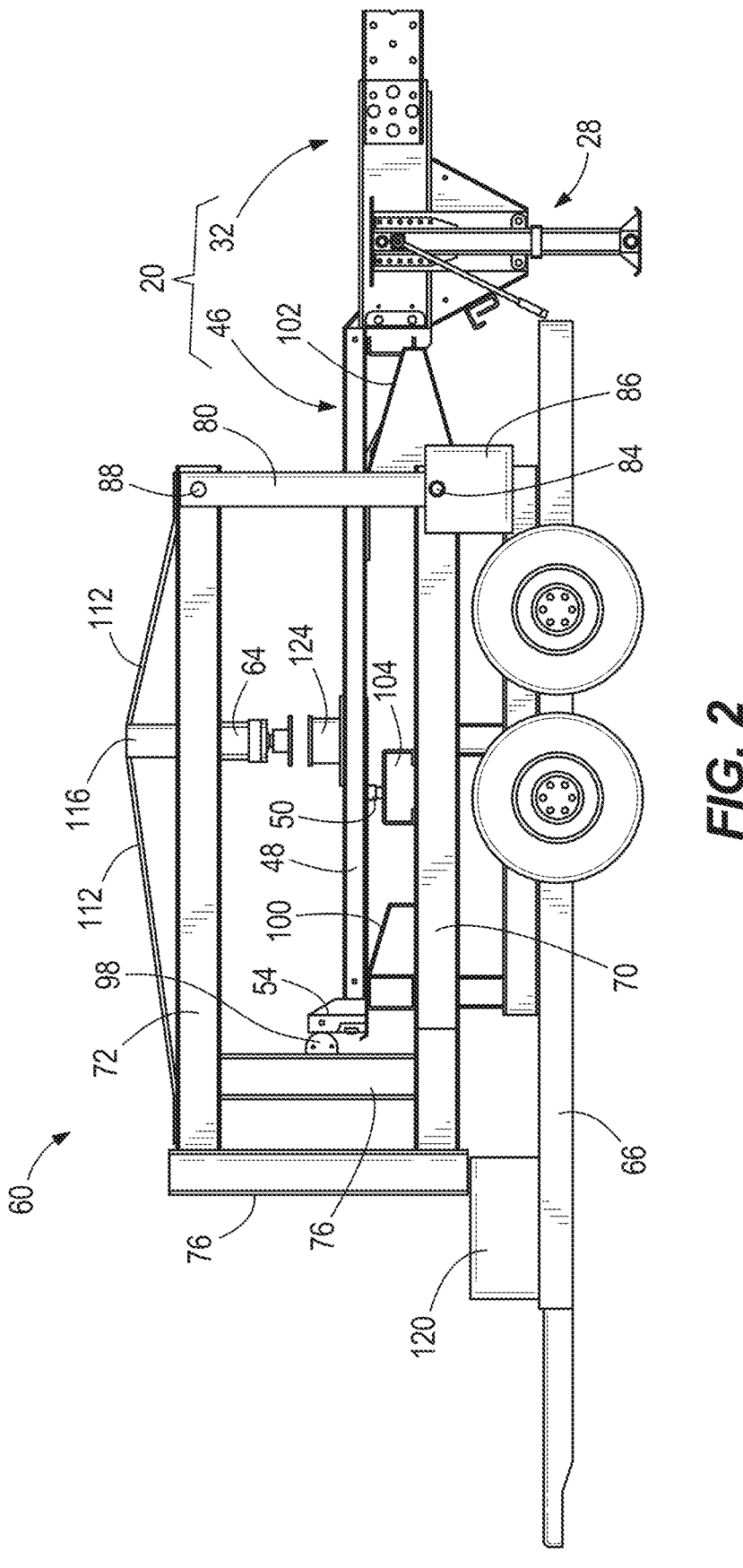
FIG. 2 is a side elevation view of a gooseneck straightener according to one embodiment of the present disclosure. A container chassis gooseneck is shown in an operative position within the straightener.

The frame structure of the straightener 60 includes a bottom section 70 and a top section 72 spaced above the bottom section 70. Each of the bottom and top sections 70, 72 span a width, which can correspond to a width of the wheeled trailer 66. Between the bottom and top sections 70, 72, a receiving channel or working space is defined for receiving a lengthwise span, for example all or a majority, of the gooseneck 46. Each of the bottom and top sections 70, 72 can be formed from a plurality of elongate structural members, such as hollow beams or tubes. The structural members that make up the bottom and top sections 70, 72 can be joined together as a permanent weldment. Connection between the bottom and top sections 70, 72 can be made by a plurality of vertical frame members, including fixed or permanent connections at a forward end of the frame structure (e.g., columns 76) and removable connections at a rearward end of the frame structure (e.g., two laterally-spaced links 80) where the container chassis 20 moves into and out of the interior space of the frame structure. Thus, in side view as shown in FIG. 2, the frame structure defines a box when the links 80 are secured in place—but otherwise generally defines a "C" or sideways "U" shape. Each of the removable links 80 has a coupled state in which it rigidly secures the top and bottom sections and an uncoupled state in which the top and bottom sections are unsecured at the rear end.

Figure 6:
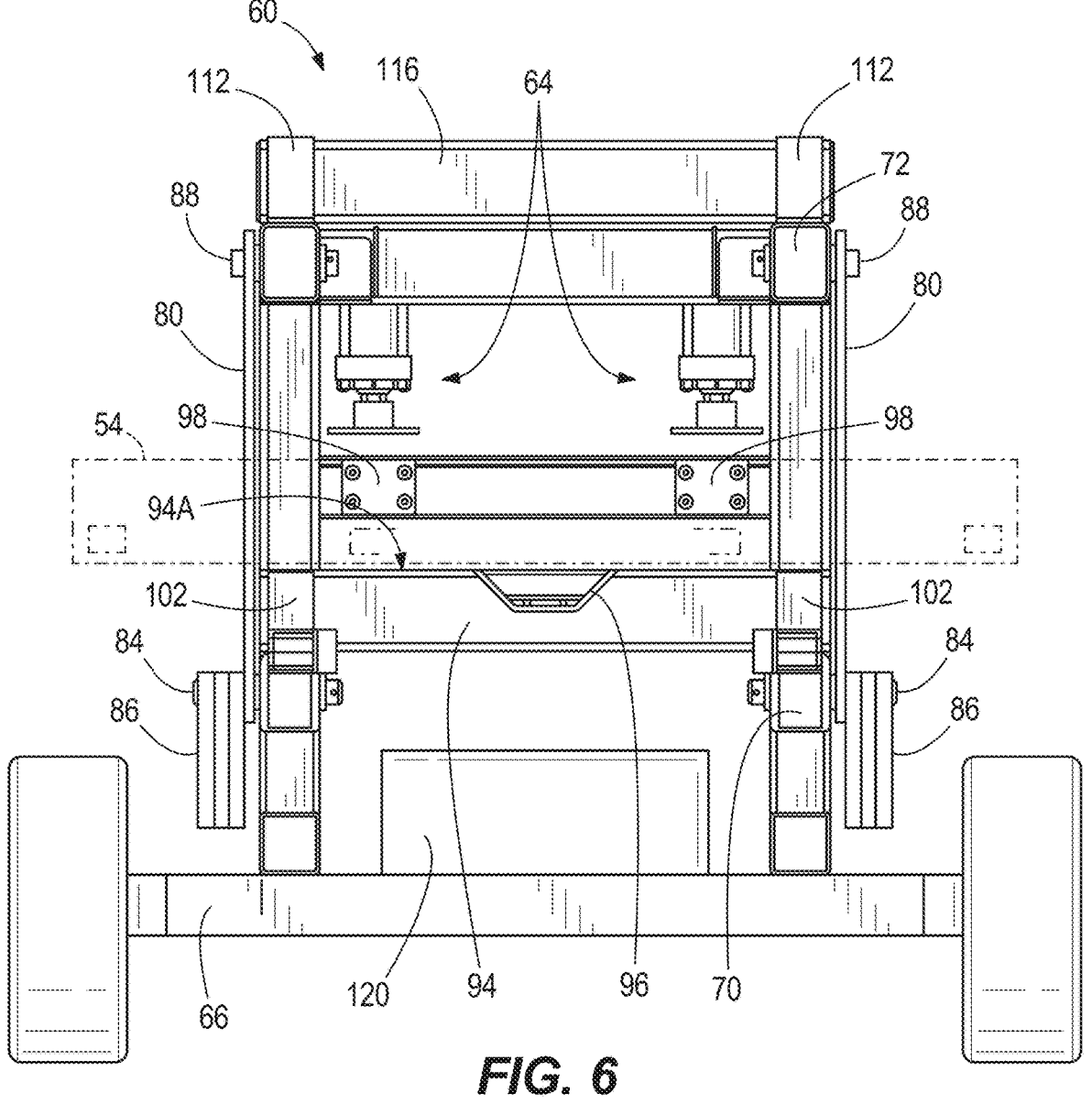
FIG. 6 is a rear elevation view of the gooseneck straightener of FIG. 5.
Figure 7:
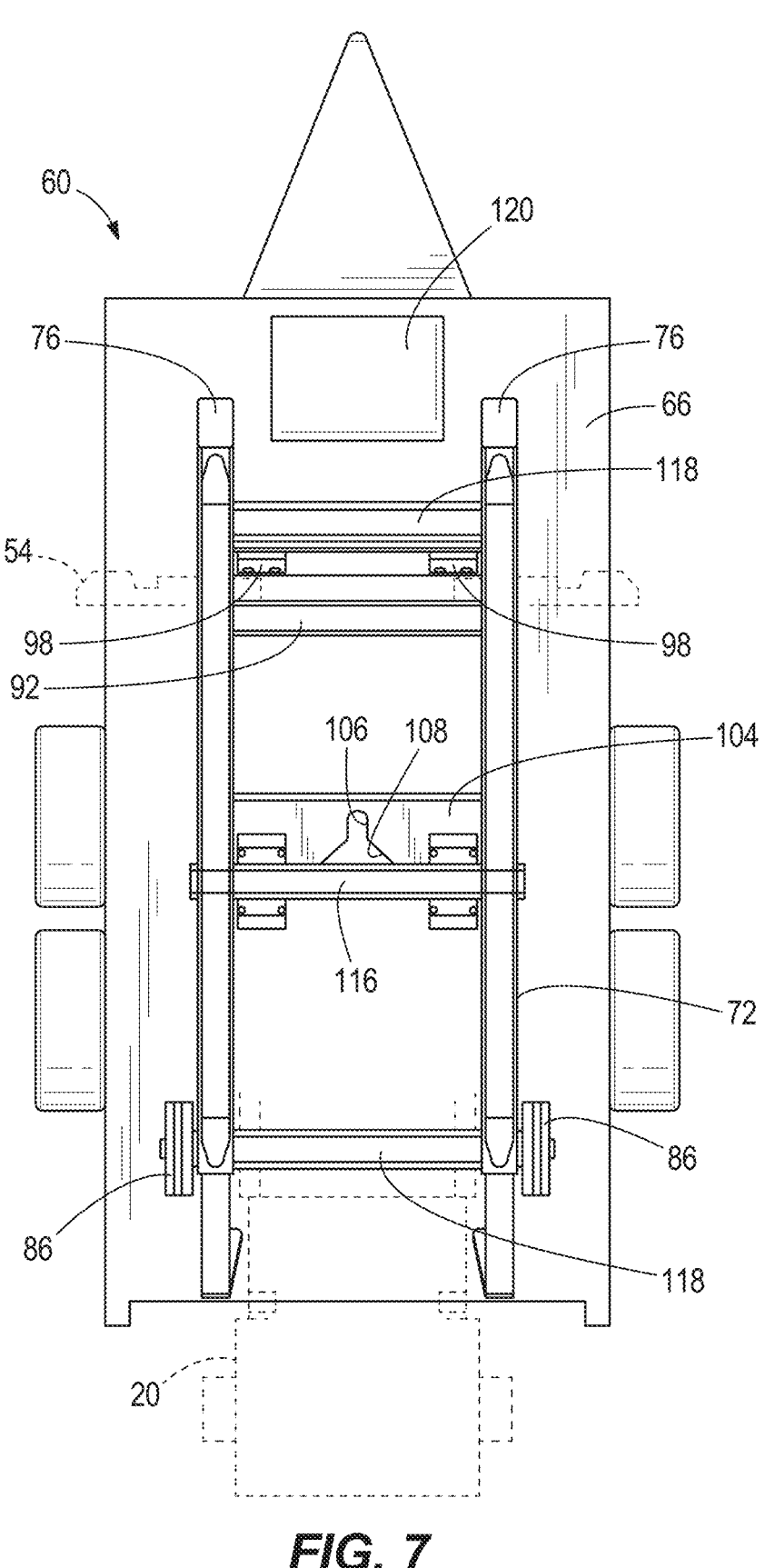
FIG. 7 is a top plan view of the gooseneck straightener of FIGS. 5 and 6.

As shown in the rear view of FIG. 6, where the front bolster 54 of the container chassis 20 is shown in phantom, the removable links 80 are set at a width that otherwise prevents passage of the front bolster 54 into the interior space of the frame structure of the straightener 60. Thus, the removable links 80 are removed from the coupled state for insertion/removal of the container chassis 20. On the other hand, use of the straightener's hydraulic cylinders 64 can generate thousands of pounds of vertical straightening loads that are borne by the frame structure, and thus, the removable links 80 are connected in place to complete the box of the frame structure around the gooseneck 46. In order to make the connection/disconnection procedure for the links 80 more convenient and easy for a human operator to complete, each of the links 80 can be pivotally mounted (e.g., about a horizontal pivot connection 84) such that it is configured to swing between the coupled and uncoupled states, while remaining connected (with a degree of freedom) to the frame structure of the straightener 60. As shown in the drawings, a counterweight 86 can be provided on a short bottom end of each link 80, below the pivot connection 84. As such, very little effort is required to pivot the link 80. For securement of each link 80 into the coupled state, a load bearing connection is formed with the top section 72 of the frame structure. The connection can be formed by a locking pin 88. The locking pins 88 can have sufficient diameter and material strength to bear (in shear) the straightening loads exerted by the hydraulic cylinders 64. Alternate structural connections of the removable links 80 are also contemplated.

Figure 3:
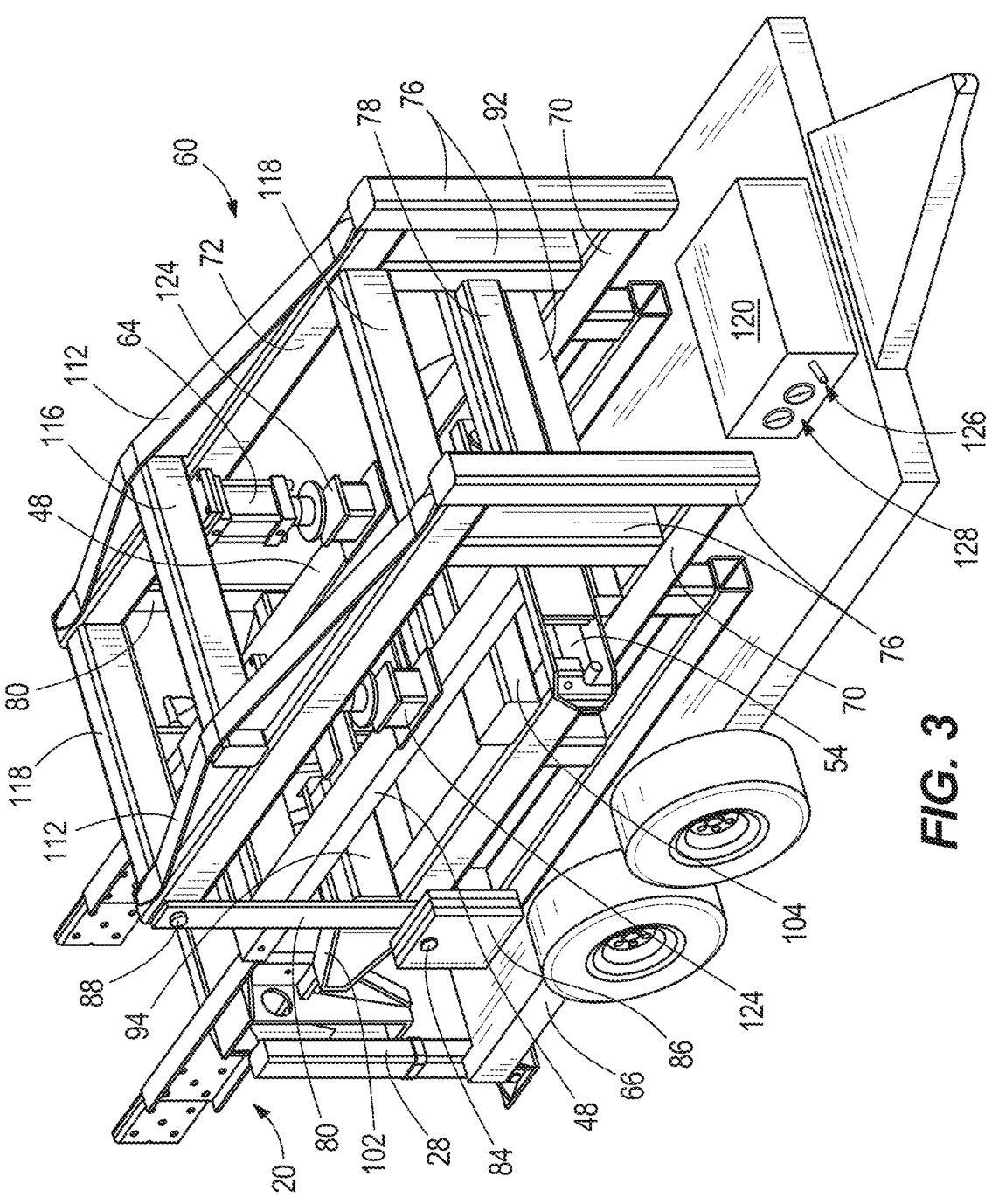
FIG. 3 is a first perspective view of the gooseneck straightener of FIG. 2 with the container chassis gooseneck.
Figure 4:
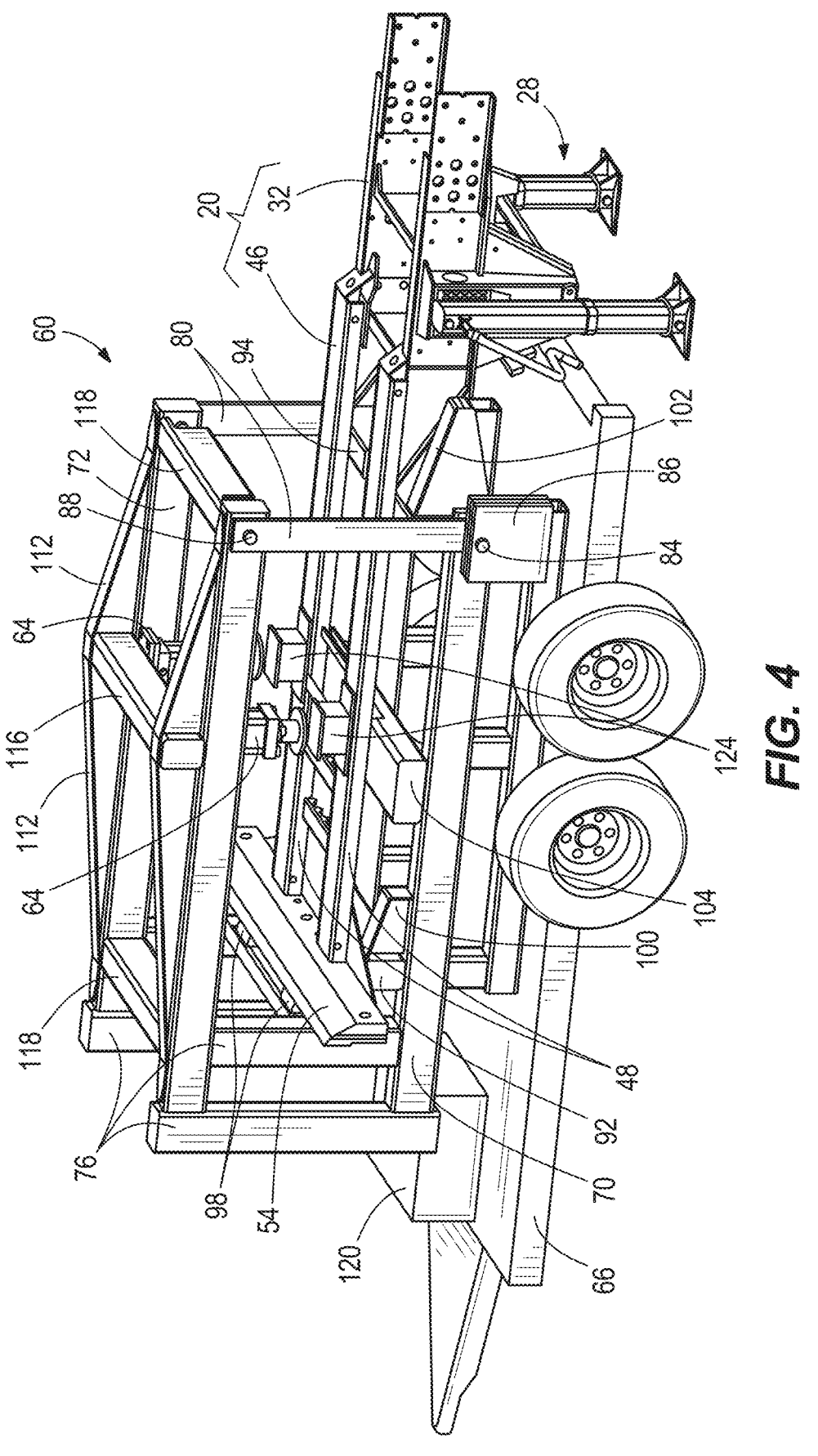
FIG. 4 is a second perspective view of the gooseneck straightener of FIG. 2 with the container chassis gooseneck.
Figure 5:
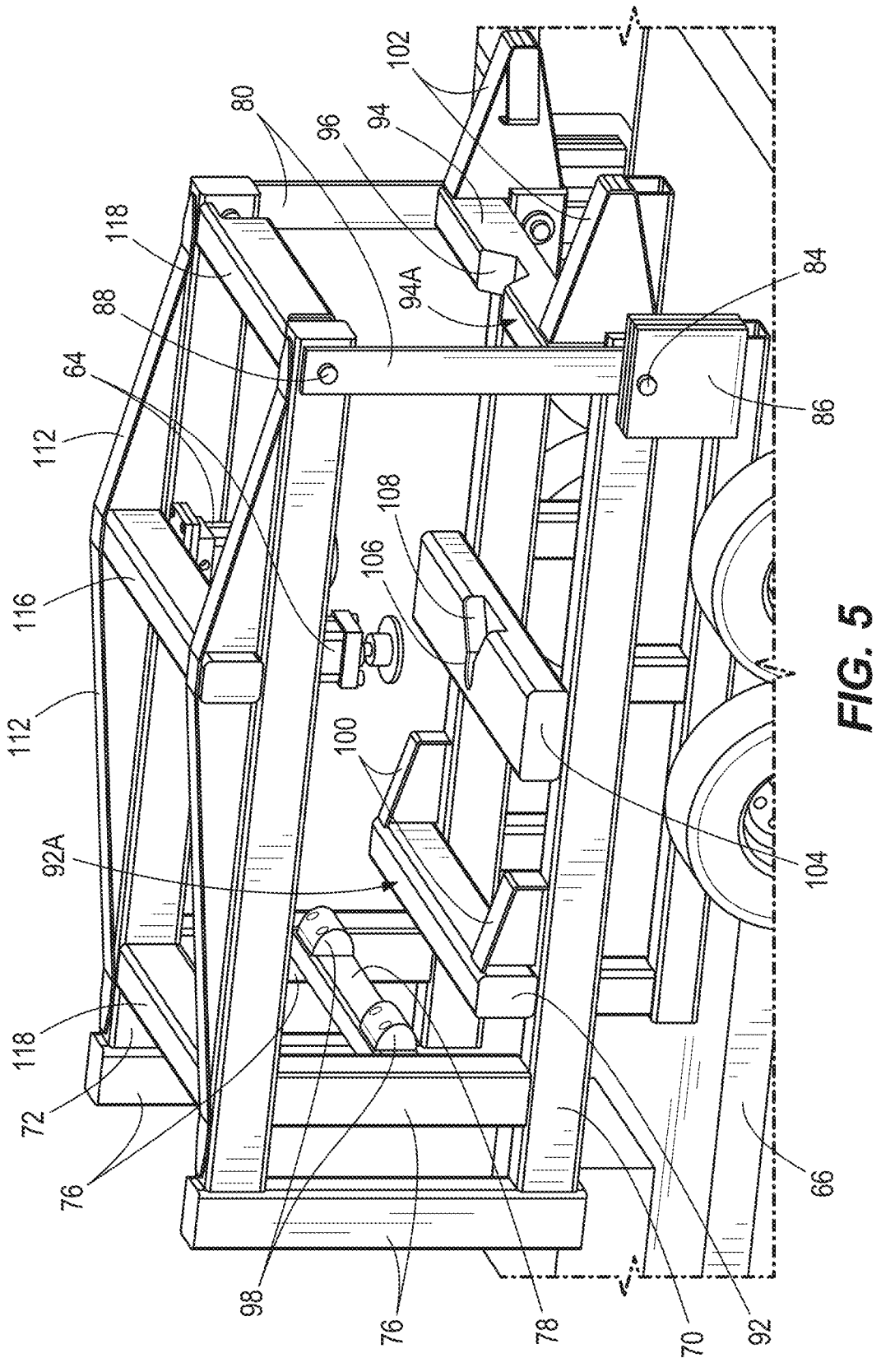
FIG. 5 is a detail perspective view of a central portion of the gooseneck straightener as shown in FIG. 4, except having the container chassis gooseneck removed.

As shown in FIGS. 2-5, reaction members 92, 94 are formed at multiple locations along the length of the straightener 60—either integrated in the bottom section 70 or supported by the bottom section 70. The reaction members 92, 94 can be elongate structural members, such as hollow beams or tubes. Each reaction member 92, 94 includes a top reaction surface 92A, 94A configured to receive a corresponding bottom surface of the gooseneck 46 during a straightening operation. The forward reaction member 92 is positioned adjacent the columns 76 and configured to support the gooseneck 46 at or near the front bolster 54. The front bolster 54 may contact one or more resilient bumpers or pads 98 situated on the rear-facing surface(s) of the columns 76, or column assembly. For example, FIGS. 3 and 5 illustrate a column assembly including two of the columns 76 and a crossbeam 78 that altogether form an "H" (e.g., the crossbeam 78 is oriented horizontal along a mid-height portion of the columns 76). The crossbeam 78 As best shown in FIGS. 3 and 4, the rearward reaction member 94 is provided with a central recess 96 configured to allow passage of the king pin 50, since the rearward reaction member 94 would otherwise interfere with the king pin 50 during gooseneck insertion/retraction.

The straightener 60 can include a plurality of guides that function to automatically position the gooseneck 46 into the working space of the frame structure when the wheeled trailer 66 is backed up to the stationary container chassis 20. The guides can include vertical ramps 100, 102 extending from the rear side up to the respective reaction members 92, 94. The vertical ramps 100, 102 act to raise the gooseneck 46 up to the respective top reaction surfaces 92, 94A when contacted by the bottom surface of the gooseneck 46. Prescribed vertical positioning between the straightener 60 and the gooseneck 46 is thus achieved. Additionally, a prescribed horizontal position is achieved by a king pin guide member 104 having a king pin receptacle 106. During entry of the gooseneck 46, the king pin 50 thereof is guided into the prescribed horizontal (centered) position by a tapered inlet portion 108 of the king pin guide member 104. The king pin guide member 104, however, does not function to establish a typical fifth-wheel type locking in the vertical direction. In other words, the receptacle 106 does not have a cross-section profile that fits into the groove of the king pin 50. Rather, the receptacle 106 allows vertical movement of the king pin 50 therein—vertical movement being anticipated during a straightening operation. The king pin receptacle 106 is closed at the front to limit forward travel of the chassis 20 with respect to the straightener 60 (e.g., during rearward movement of the straightener 60 onto the stationary chassis 20).

In the illustrated construction, the two reaction members 92, 94 and particularly their reaction surfaces 92A, 94A define a lengthwise (i.e., longitudinal) span for supporting the underside of the gooseneck 46 during straightening. Approximately midway along this lengthwise span is where the hydraulic cylinders 64 are located. The position of the hydraulic cylinders 64 can be fixed or adjustable along the top section 72 of the frame structure. A longitudinal positioning of the hydraulic cylinders 64 can be appreciated from FIG. 2. Also shown there is additional gusseting 112 for the top section 72. The additional gusseting 112 has a rising height toward a central portion where the hydraulic cylinders 64 are positioned. In particular, the top section 72 can include a transverse crossbeam 116 extending between the longitudinal beams (e.g., positioned along the top of these longitudinal beams) to connect the hydraulic cylinders 64 to the top section 72 of the frame structure. The top section 72 can include additional transverse crossbeams 118, for example fore and aft of the transverse crossbeam 116 to which the hydraulic cylinders 64 are connected. The additional transverse crossbeams 118 provide extra reinforcement to the top section 72 of the frame structure. Various sizes and configurations of hydraulic cylinders can be utilized in the straightener 60. For example, the illustrated construction provides one hydraulic cylinder 64 on the left side and one hydraulic cylinder 64 on the right side. The left and right (i.e., lateral or transverse) spacing of the hydraulic cylinders 64 generally corresponds to the beams 48 of the gooseneck 46 to be straightened. In other constructions, greater or fewer hydraulic cylinders 64 can be provided, and the sizing of the individual hydraulic cylinders 64 can be reduced where more cylinders are provided and increased where fewer cylinders are provided.

Powered hydraulics, including a pump for pressurizing and moving hydraulic fluid, for running the cylinders 64 can be integrated on the straightener 60 so that it is rendered fully operable as a standalone self-powered unit, which does not require connection to outside power sources or devices for straightening a gooseneck 46. As illustrated, the hydraulic power source 120 can be supported by the wheeled trailer 66, for example at a forward end thereof. The hydraulic power source 120 can be a fuel-burning engine-powered hydraulic supply system connected with the hydraulic cylinders (via lines not shown) to power movement of the cylinders 64 or a battery powered electric hydraulic supply system. As will be appreciated from the drawings, the cylinders 64 are powered to extend the pistons thereof to apply vertical load to the top of the gooseneck 46, as the bottom of the gooseneck 46 is supported at the reaction surfaces 92A, 94A—thus enabling correction of droop and/ or crown along the length of the gooseneck 46. As shown in FIG. 2, spacer blocks referred to herein as pressure transfer members 124 can be situated between the distal ends of the hydraulic cylinders 64 and the top surface of the gooseneck 46. The pressure transfer members 124 can be loosely handled separate from the frame structure and the hydraulic cylinders 64. The pressure transfer members 124 can have any suitable construction, but may include extended top and bottom plates that distribute the loads over a greater area, as compared to the distal ends of the hydraulic cylinders 64. By taking up a substantial height between the hydraulic cylinders 64 and the gooseneck 46, the pressure transfer members 124 also reduce the chance of interference when loading/ unloading and reduce the required stroke of the hydraulic cylinders 64. One pressure transfer member 124 may be provided along the top of each of the gooseneck beams 48. These are then removed directly following the straightening operation. During operation by a human operator, the operator can manually control the load applied by the hydraulic cylinders 64 via a control device 126 with at least on/off controls operable to control the extension/retraction of the hydraulic cylinders 64. The control device 126 can be fixed on or tethered to the straightener 60, or alternately configured for wireless commands to a controller of the hydraulic power source 120. The straightener 60, for example at the hydraulic power source 120, can include one or more gauges 128 (FIG. 3) for indicating hydraulic pressure or load. The operator may view the gauges 128 in addition to viewing the shape of the gooseneck 46 itself during a straightening operation.

In one aspect, a method of correcting the shape of the deformed gooseneck 46 with the mobile straightener 60 includes the following steps. As shown in the drawings, the mobile straightener 60 is provided on the wheeled trailer 66 and towed to the site of the deformed gooseneck. A structural link (e.g., both links 80) is removed at the rear end of the frame structure of the mobile straightener 60 to widen an entry path for the gooseneck 46 to enter a receiving channel thereof. The wheeled trailer 66 is backed up to a front of the container chassis 20 to accept the deformed gooseneck 46 into the receiving channel. The deformed gooseneck 46 is guided into a prescribed position by the plurality of guides 100, 102, 104 on the frame structure. Reference is made to the preceding description regarding the specific functions of each of the guides 100, 102, 104. The links 80 are re-coupled while the deformed gooseneck is in the receiving channel to restrict the entry path. The deformed gooseneck is supported at the forward reaction member 92 of the frame structure and the rearward reaction member 94 of the frame structure. Vertical load is applied to the deformed gooseneck 46 at a position between the forward and rearward reaction members 92, 94 with at least one of the hydraulic cylinders 64. The vertical load is transmitted through the gooseneck 46 to the forward and rearward reaction members 92, 94 to correct the deformation in the gooseneck 46. In some cases, this can include re-shaping the gooseneck 46, as viewed in side elevation view, from a bent or curved shape to a straight shape. The hydraulic cylinder 64 is/are powered by the hydraulic power unit 120 on-board the wheeled trailer 66. Then, the links 80 at the rear end are removed to widen the entry path. In this condition, the wheeled trailer 66 can be pulled forward such that the corrected gooseneck 46 is removed from the mobile straightener 60.

What is claimed is:

1. A mobile container chassis gooseneck straightener comprising:

a wheeled trailer including a base and a tongue provided at a front end of the wheeled trailer and configured to join with a hitch of a tow vehicle;

a frame structure including a top section and a bottom section spaced from the top section to receive a container chassis gooseneck therebetween, the frame structure further including a front end with a fixed column extending between the top and bottom sections, and the frame structure further including a rear end comprising a removable link connecting the top and bottom sections, the removable link having a coupled state in which it rigidly secures the top and bottom sections via a direct vertical connection therebetween and an uncoupled state in which the top and bottom sections are unsecured at the rear end;

a hydraulic cylinder supported by the frame structure and configured to exert a vertical load on the container chassis gooseneck to be straightened within the frame structure, wherein the frame structure, including the removable link, is configured to bear the vertical load; and a hydraulic power source supported by the wheeled trailer and connected with the hydraulic cylinder to power movement of the hydraulic cylinder.

2. The mobile container chassis gooseneck straightener of claim 1, wherein the removable link is one of two laterally-spaced removable links, each of which has a respective pivot connections with the frame structure.

3. The mobile container chassis gooseneck straightener of claim 2, wherein each of the two laterally-spaced removable links is counterweighted for pivoting movement about the respective pivot connections.

4. The mobile container chassis gooseneck straightener of claim 2, wherein the respective pivot connections are defined on the bottom section of the frame structure, and the two laterally-spaced removable links are selectively connected to the top section of the frame structure by respective locking pins to define the coupled state and the uncoupled state.

5. The mobile container chassis gooseneck straightener of claim 1, further comprising a plurality of guides configured to guide the container chassis gooseneck into a prescribed horizontal and vertical position with respect to reaction members of the frame structure that are configured to bear loads applied by the hydraulic cylinder and transferred through the container chassis gooseneck.

6. The mobile container chassis gooseneck straightener of claim 5, wherein the plurality of guides include a king pin guide member having a king pin receptacle and a tapered inlet portion.

7. The mobile container chassis gooseneck straightener of claim 6, wherein the plurality of guides further comprises a plurality of vertical ramps extending forwardly to rear sides of the reaction members.

8. The mobile container chassis gooseneck straightener of claim 1, wherein the frame structure includes a front column assembly including the fixed column, an additional fixed column, and a crossbeam extending between the fixed column and the additional fixed column, the front column assembly having a resilient bumper on a rear-facing surface thereof.

9. The mobile container chassis gooseneck straightener of claim 1, wherein the hydraulic cylinder is one of a plurality of hydraulic cylinders spaced apart on two lateral sides of the frame structure.

10. A mobile container chassis gooseneck straightener comprising:

a wheeled trailer including a base and a tongue configured to join with a hitch of a tow vehicle;

a frame structure including a top section and a bottom section spaced from the top section to receive a container chassis gooseneck therebetween, the frame structure further including a front end with a fixed column extending between the top and bottom sections, and the frame structure further including a rear end comprising a removable link connecting the top and bottom sections, the removable link having a coupled state in which it rigidly secures the top and bottom sections and an uncoupled state in which the top and bottom sections are unsecured at the rear end;

a hydraulic cylinder supported by the frame structure and configured to exert a vertical load on the container chassis gooseneck to be straightened within the frame structure, the frame structure, including the removable link, configured to bear the vertical load; and a hydraulic power source supported by the wheeled trailer and connected with the hydraulic cylinder to power movement of the hydraulic cylinder, wherein the removable link is one of two laterally-spaced removable links, each of which has a respective pivot connection with the frame structure, and wherein each of the two laterally-spaced removable links is counterweighted for pivoting movement about the respective pivot connections.

11. A mobile container chassis gooseneck straightener comprising:

a wheeled trailer including a base and a tongue configured to join with a hitch of a tow vehicle;

a frame structure including a top section and a bottom section spaced from the top section to receive a container chassis gooseneck therebetween, the frame structure further including a front end with a fixed column extending between the top and bottom sections, and the frame structure further including a rear end comprising a removable link connecting the top and bottom sections, the removable link having a coupled state in which it rigidly secures the top and bottom sections and an uncoupled state in which the top and bottom sections are unsecured at the rear end;

a hydraulic cylinder supported by the frame structure and configured to exert a vertical load on the container chassis gooseneck to be straightened within the frame structure, the frame structure, including the removable link, configured to bear the vertical load; and a hydraulic power source supported by the wheeled trailer and connected with the hydraulic cylinder to power movement of the hydraulic cylinder, wherein the removable link is one of two laterally-spaced removable links, each of which has a respective pivot connection with the frame structure, and wherein the respective pivot connections are defined on the bottom section of the frame structure, and the two laterally-spaced removable links are selectively connected to the top section of the frame structure by respective locking pins to define the coupled state and the uncoupled state.

* * * * *